United States Patent [19]
McEvoy

[11] Patent Number: 5,333,101
[45] Date of Patent: Jul. 26, 1994

[54] BICYCLE LIGHT
[75] Inventor: Paul McEvoy, San Marcos, Calif.
[73] Assignee: Western Crown Management Inc., Sechelt, Canada
[21] Appl. No.: 27,680
[22] Filed: Mar. 8, 1993
[51] Int. Cl.5 .............................................. B62J 6/00
[52] U.S. Cl. ..................................... 362/72; 362/276; 362/802; 340/432
[58] Field of Search ................... 362/72, 78, 157, 276, 362/802; 315/200 A, 360, 362, 77, 136, 209 R; 340/432

[56] References Cited

U.S. PATENT DOCUMENTS

| | | | |
|---|---|---|---|
| 3,771,019 | 11/1973 | Bolinger | 315/200 A |
| 3,987,409 | 10/1976 | Freeman | 340/134 |
| 4,135,229 | 1/1979 | Modurkay | 362/72 |
| 4,176,390 | 11/1979 | Galbert | 362/72 |
| 4,225,848 | 9/1980 | Roberts | 340/134 |
| 4,323,879 | 4/1982 | Kelley | 362/72 |
| 4,796,972 | 1/1989 | Thomas et al. | 340/432 |
| 4,878,014 | 11/1988 | Wodder et al. | 362/78 |

FOREIGN PATENT DOCUMENTS

| | | | |
|---|---|---|---|
| 9112977 | 9/1991 | PCT Int'l Appl. | 362/72 |
| 2246625 | 2/1992 | United Kingdom | 362/72 |

Primary Examiner—Ira S. Lazarus
Assistant Examiner—Sara Sachie Raab
Attorney, Agent, or Firm—Jacobson & Johnson

[57] ABSTRACT

A bicycle safety light is mounted on the spoke of a bicycle wheel for rotation with the wheel. The light includes a light transmitting, refractive housing with an internal light and light operating circuit. The light is driven by a flasher circuit to produce a flickering effect. The flasher circuit itself is initiated by a motion sensor that senses any motion of the bicycle wheel. A time delay sustains operation of the flickering light for a predetermined period between activations of the motion sensor.

9 Claims, 3 Drawing Sheets

5,333,101

BICYCLE LIGHT

FIELD OF THE INVENTION

The present invention relates to bicycle lights and more particularly to lights intended to make bicycles visible when ridden at night.

BACKGROUND

It is conventional to equip bicycles with reflectors or lights to increase their night time visibility. Equipment that has been proposed in the past includes spoke mounted lights powered by a battery or generator through a slip ring connection at the wheel hub. These lights are complex and subject to malfunction should any of the parts or connections fail.

In some other lights, a battery is carried on the wheel thus eliminating the slip rings and extensive wiring. Such devices are of limited visibility. For example, the light described in U.S. Pat. No. 4,787,014, issued 22 Nov., 1988 to Wodder et al, the light beam is oriented almost radially from the wheel hub. The light described in U.S. Pat. No. 4,176,390 uses a flashlight powered by a penlight cell, a system that provides a relatively low intensity steady light. In addition, the battery itself acts as a switch by sliding into contact with the light base when the centrifugal force due to wheel rotation is sufficient. This limits the on state of the light to speeds above a certain minimum.

The present invention is concerned with an improved wheel-carried bicycle light.

SUMMARY

According to the present invention there is provided a bicycle light mountable on a bicycle wheel and comprising:

a housing at least partially of a light transmitting material;

mounting means for mounting the housing on the bicycle wheel;

an electrically operable light source within the housing and positioned to transmit light through the housing;

electric battery means within the housing; and circuit means within the housing electrically joining the light source and the battery means, the circuit means including:

(a) flasher means actuatable intermittently to close the circuit means so as to cause the light to source to flash intermittently;

(b) motion sensor means responsive to motion of the housing to actuate the flasher means.

The light thus flashes as the wheel rotates, providing a highly visible, flashing illumination of the housing. The motion sensor is responsive to movement of the housing so that the light operates at any wheel speed.

It is preferred that the light includes a time delay for sustaining operation of the flasher to keep the light flashing for a predetermined time after actuation of the light by the motion sensor.

It is also preferred that the motion sensor is non-directional so that actuation of the light is not limited to a case where the wheel is rotating.

The light is, therefore, a single, self-contained unit that produces a flashing light that may be refracted and diffused by appropriate prismatic formations in or on the housing. This produces what appears to be a flashing ring, preferably red in color, as the bicycle is being ridden.

BRIEF DESCRIPTION OF THE DRAWINGS

In the accompanying drawings which illustrate an exemplary embodiment of the present invention;

Referring to the accompanying drawings, FIG. 1 illustrates a bicycle wheel 10 having a rim 12 mounted by spokes 14 on a hub 16. The wheel carries a light 18 according to the invention. The light is mounted on one of the spokes to rotate with the wheel.

Figure 1:
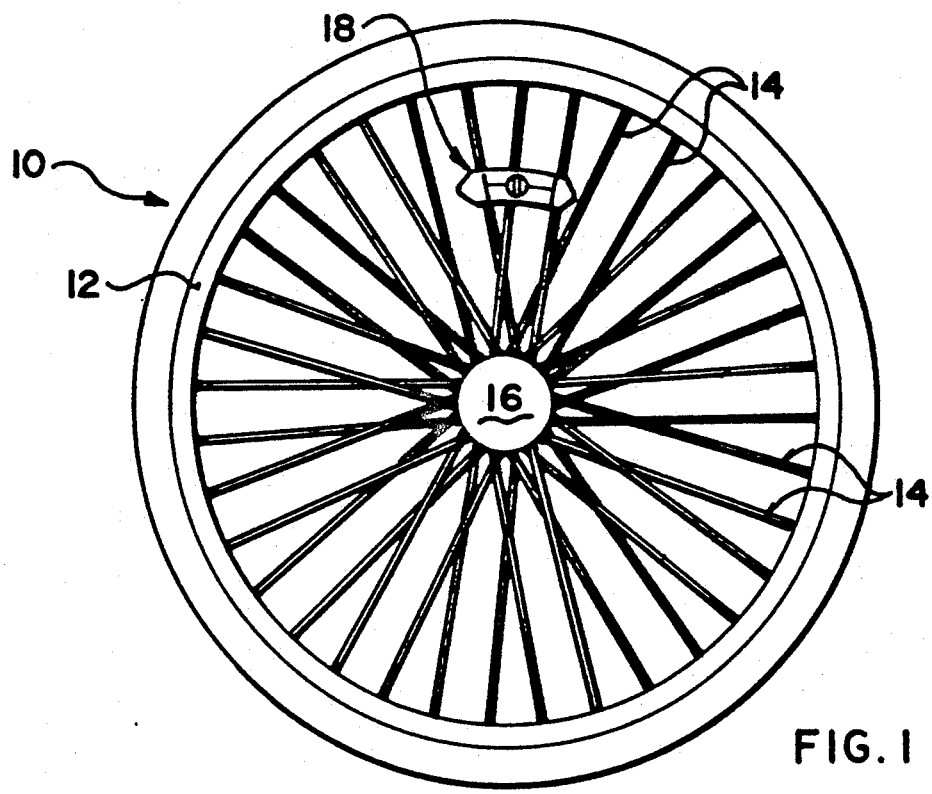
FIG. 1 is a side view of a light according to the present invention mounted on a bicycle wheel.
Figure 6:
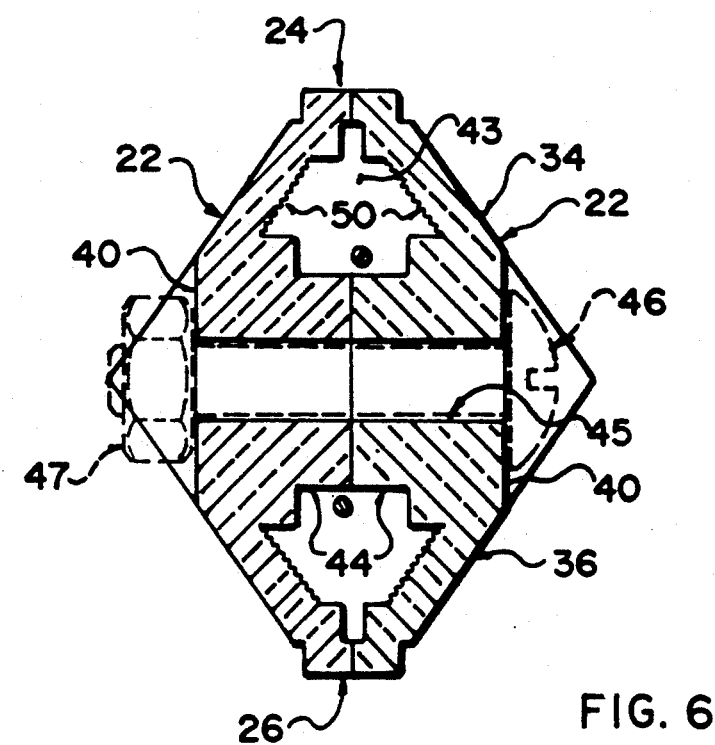
FIG. 6 is a view along line 6—6 of FIG. 2.
Figure 3:
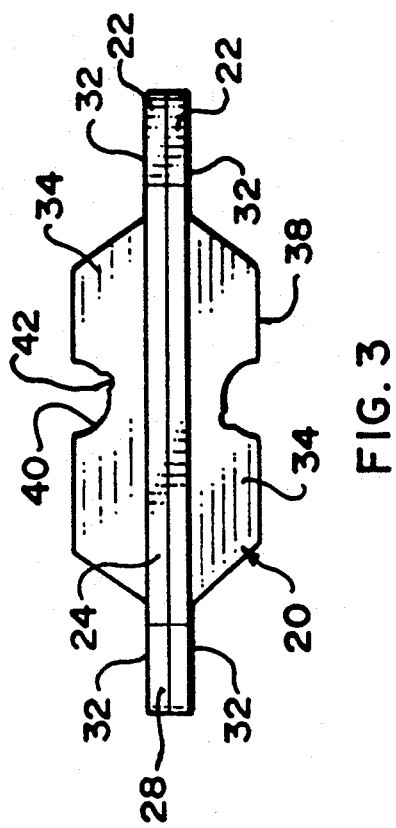
FIG. 3 is a top view of the light.
Figure 5:
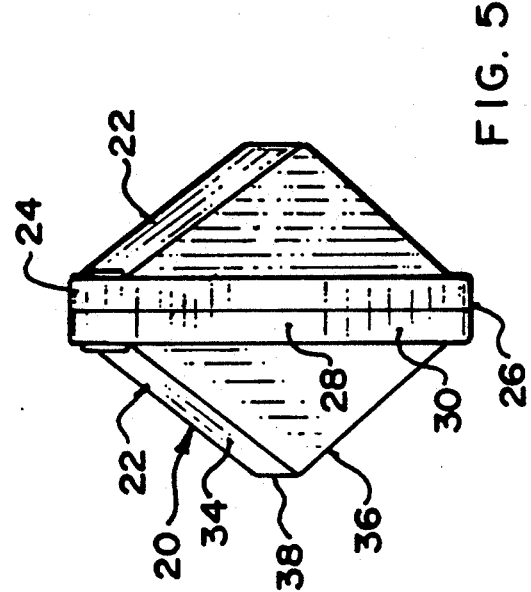
FIG. 5 is an end view of the light.
Figure 2:
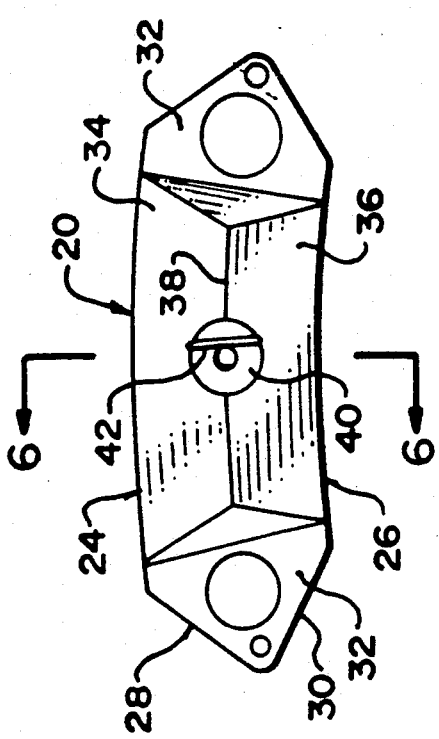
FIG. 2 is a side view of a light.
Figure 4:
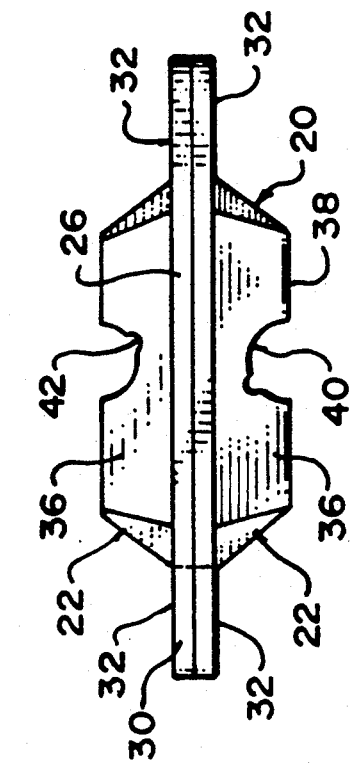
FIG. 4 is a bottom view of the light.

As illustrated most particularly in FIGS. 2 through 7, light is a single unit contained within a light-transmitting housing 20. The housing 20 has two housing halves 22 of the same construction that mate face to face to define the housing. The housing is elongate and has an arcuate top face 24, and an arcuate bottom face 26. At each end, the housing has two convergent end faces 28 and 30. At each end of the housing are flat side faces 32. Between the faces 32 each housing half 22 has two outwardly convergent side faces 34 and 36 that meet along an arcuate ridge 38. Midway along the ridge is a circular recess 40 with a flat bottom. Extending across the flat bottom is a linear spoke notch 42.

Internally, each housing half has a cavity 43 generally matching the configuration of the side faces 34 and 36. Within the cavity is an annular boss 44 aligned with the recess 40. When the housing halves are assembled, the end faces of the two bosses 44 abut one another and a through hole 45 is provided through the housing. A bolt 46 passes through the centers of the two aligned bosses and is held in place using a nut 47. The head of the bolt 46 captures a spoke in the spoke notch 42 to retain the housing on the bicycle wheel.

Figure 7:
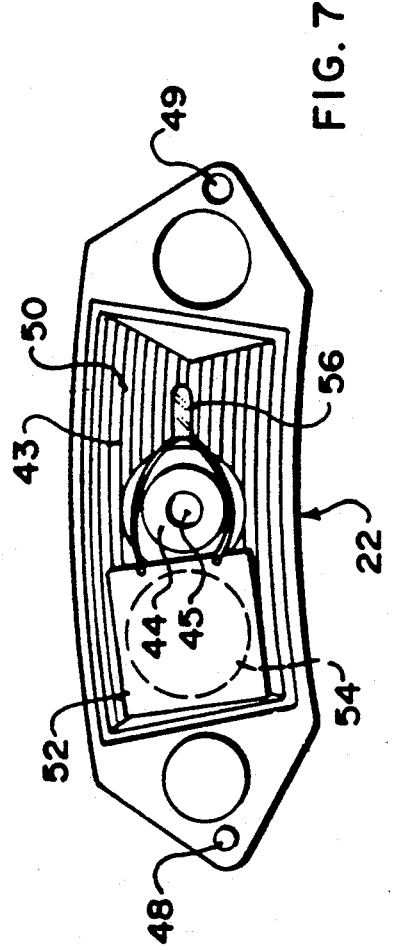
FIG. 7 is a side view of the light with one half of the housing removed.

As illustrated most particularly in FIG. 7, there is a boss 48 projecting from the inside face of each housing half 22 adjacent one end, while a mating socket 49 is formed in the inside face of the housing half at the opposite end. When the two housing halves are assembled, the boss 47 of one fits into the socket 49 of the other to hold the two halves in alignment.

Internally, the cavity 43 is formed with a pattern of prisms 50 to refract and diffuse light passing outwardly through the housing.

Mounted within the housing is a printed circuit board 52 carrying the electric circuit for the unit and a battery 54. A light 56 is connected to the circuit board and extends into the cavity within the housing so that light emitted passes through the light transmitting material that forms the housing.

Figure 8:
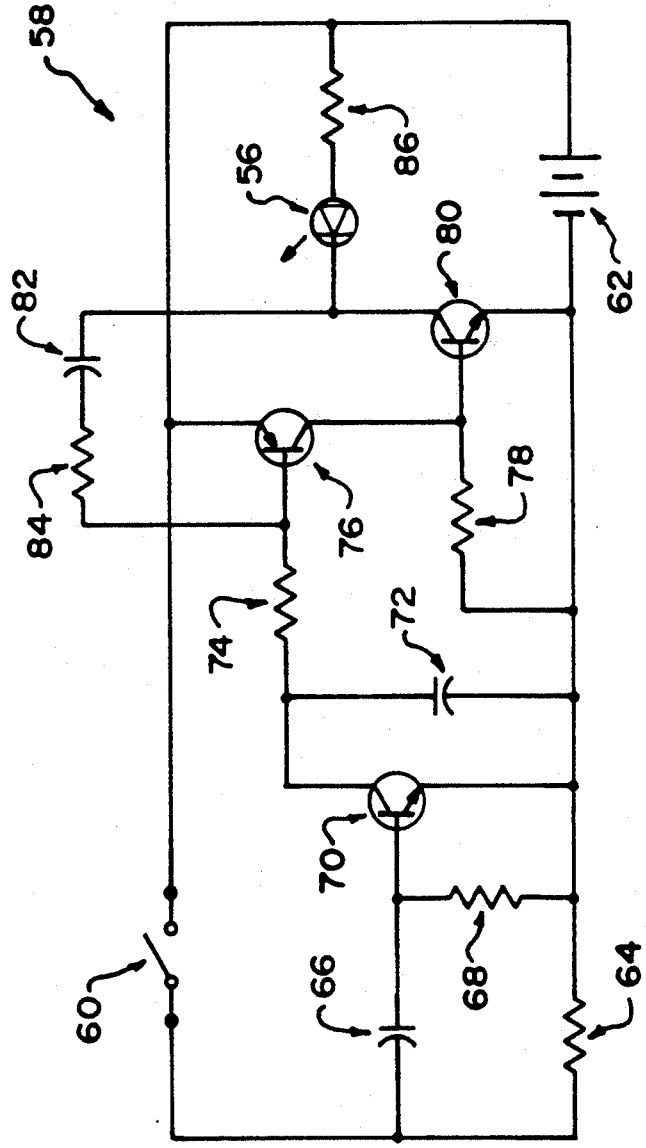
FIG. 8 is a schematic of the electrical circuit of the light.

The electric circuit 58 of the light is illustrated in FIG. 8. This includes a mercury switch 60 that is normally open and closes on any significant movement of the switch. One terminal of the switch is connected to the positive terminal of a battery 62 while the other terminal is connected through a resistor 64 to the negative terminal of the battery. Connected in parallel with the resistor 64 are a capacitor 66 and a resistor 68. The base of a transistor 70 is connected between the capacitor 66 and the resistor 68. The emitter of the transistor is connected to the negative terminal of the battery. A capacitor 72 is connected across the collector and emitter of the transistor 70, while the collector-capacitor junction is connected through a resistor 74 to the base of a transistor 76. The collector of the transistor 76 is connected through a resistor 78 to the negative terminal of the battery, while the collector is connected to the positive terminal of the battery. The collector of the transistor 76 is also connected to the base of a transistor 80, which has its emitter connected to the negative terminal of the battery. The collector of the transistor 80 is connected to a capacitor 82 in series with a resistor 84, coupled to the base of the transistor 76. The light 56 is a light emitting diode (LED) connected through a resistor 86 to the positive side of the battery and to the collector of the transistor 80.

In operation, a change of state of the switch 60 is detected by the capacitor 66 for switching transistor 70. Transistors 76 and 80 constitute a relaxation oscillator, the operation of which is initiated by transistor 70, causing LED 56 to flash at a rate controlled by the values of capacitor 82 and resistor 84. The capacitor 72 acts as a timing capacitor for sustaining operation of the oscillator for a predetermined time between pulses from the switch 60.

When the light is installed on the spoke of a bicycle wheel, any movement of the wheel, whether rotational movement or movement to one side or the other will close the motion sensor switch and initiate operation of the flashing circuitry. The LED within the unit will flash for a predetermined period, producing a highly visible flickering through the refractive prisms on the inside of the housing. When the bicycle is in motion, the light remains continuously active and will produce a flickering ring of light which is highly visible from all directions.

Because of the time delay built into the unit, a temporary halt does not bring an immediate cessation of the light so that in most instances, the light will continue to flicker almost continuously even while waiting at a stop light, through periodic activation by movements of the bicycle rider.

While one embodiment of the invention has been described in the foregoing, it is to be understood that other embodiments are possible within the scope of the invention. It is therefore the intention that the scope of the invention should be ascertained solely by reference to the accompanying claims.

I claim:

1. A self-contained bicycle light mountable on a bicycle wheel and comprising:

a housing at least partially of a light transmitting material;

mounting means for mounting the housing on the bicycle wheel;

an electronically operable light source within the housing and positioned to transmit light through the housing;

electric battery means within the housing; and circuit means within the housing electrically joining the light source and the battery means, the circuit means including:

(a) flasher means actuable to close the circuit means intermittently so as to cause the light source to flash intermittently;

(b) motion sensor means responsive to motion of the housing in any direction to actuate the flasher means, and (c) time delay means for sustaining the operation of the flasher means for a predetermined duration after actuation of the flasher means by the motion sensor means.

2. A light according to claim 1 wherein the flasher means comprise a relaxation oscillator.

3. A light according to claim 2 wherein the motion sensor means comprise a mercury switch.

4. A light according to claim 1 wherein the housing comprises a plurality of light refracting prisms.

5. A light according to claim 1 wherein the housing is elongate and the mounting means comprise means for mounting the housing to extend circumferentially of the wheel.

6. A light according to claim 5 wherein the mounting means comprise means for mounting the housing on a spoke of the wheel.

7. A bicycle light mounted on a bicycle wheel having a plurality of spokes, the light comprising:

a housing having a cavity therein with at least portions of the housing on opposite sides of the cavity being of light transmitting material;

mounting means for mounting the housing on at least one spoke of the wheel;

an electric light within the cavity;

an electric battery within the cavity; and circuit means within the cavity electrically joining the light and the battery, the circuit means including:

flasher means actuable to close the circuit intermittently so as to cause the light source to flash intermittently;

motion sensor means responsive to motion of the housing in any direction to actuate the flasher means; and time delay means for sustaining the operation of the flasher means for a predetermined duration after actuation of the flasher means by the motion sensor means.

8. A light according to claim 7 wherein the light transmitting portions of the housing comprise prism means.

9. A light according to claim 8 wherein the prism means are within the cavity.

* * * * *